Patented Aug. 19, 1947

2,426,121

UNITED STATES PATENT OFFICE 2,426,121

PRODUCTION OF ORGANO-SILICON COMPOUNDS

John B. Rust, West Orange, and Charles A. MacKenzie, Upper Montclair, N. J., assignors to Montclair Research Corporation, a corporation of New Jersey No Drawing. Application October 3, 1944, Serial No. 557,046

14 Claims. (Cl. 260—607)

This invention relates to organo silicon derivatives containing hydrocarbon groups such as aliphatic, carbocyclic and alicyclic groups and to processes of making such products and compositions containing the same; and more particularly to such organo silicon derivatives containing from one to four substituent hydrocarbon groups and where less than four hydrocarbon groups are present, the remaining valences of the silicon are satisfied by halogens.

Heretofore alkyl and aryl silicon halide derivatives have been made primarily by the action of alkyl- or aryl-magnesium halides on silicon halides. It has also been reported that certain other metal alkyls such as zinc and mercury alkyls may be employed. When using the alkyl- or arylmagnesium halides relatively large amounts of ethyl ether were previously employed and the process had to be carried out in at least two steps, namely: (1) preparation of the Grignard reagent, and (2) reaction of the silicon halide with the Grignard reagent. In such processes troublesome and difficultly workable organo magnesium halides were employed giving rise to difficulties in and control of the process. Furthermore the yields were unsatisfactory since there were losses not only in the first step, but also in the second step.

One step reactions have also been used or suggested to a limited extent in the prior art but as there suggested they have proved difficult to carry out, the yields have not been satisfactory, and such process were applicable at best only to very limited derivatives. And in such one step processes as those carried out in the prior art, as well as in the two stage processes referred to above, complex mixtures of derivatives were obtained without control being possible to limit the reaction primarily to a particular type of organo silicon derivative desired.

Among the objects of the present invention is the production of carbon silicon bonded materials by economic and simple methods.

Other objects include the production of substituted silicon halides and related compounds in one step without separately preparing the intermediate Grignard reagents, giving the desired products in high yield and a high state of purity.

Still further objects include control of the process for the production of a desired individual organo silicon derivative as the principal if not the only reaction product.

Still further objects include the production of silicon derivatives such as substituted silicon halides and hydrolytic and conversion products thereof in good yield by relatively controllable inexpensive processes.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

This application is a continuation-in-part of application Serial No. 509,017, filed November 3, 1943, entitled Organo-silicon derivatives and process of making same.

In accordance with the present invention a mixture of halo hydrocarbon, particularly a chloride, bromide or iodide of an aliphatic, aromatic, or cyclic non-aromatic hydrocarbon and a silicon halide is reacted in the presence of magnesium at an elevated temperature under controlled conditions to give the desired reaction product. The process is essentially a one step reaction for the production of the organo silicon halide or related derivative which obviates the use of the troublesome and difficulty workable organo magnesium halides. Thus a halo hydrocarbon such as an alkyl or an aryl halide is mixed with a silicon halide and the mixture added to magnesium metal at an elevated temperature in a one-stage reaction. It has been found that the reaction may be carried out either in the presence of or in the absence of a solvent, or if desired, a solvent may be added at the end of the reaction to dilute the reaction mixture. If a solvent is employed, it may be an ether, a hydrocarbon such as an aromatic, aliphatic or alicyclic hydrocarbon and the like, such solvents desirably being liquids at ordinary temperatures or liquid at the temperature at which the reaction is carried out. In general solvents may be used which are employed in the formation of Grignard reagents, and the term Grignard solvent is hereinafter used to cover such solvents particularly organic liquids which are commonly employed in the formation of Grignard reagents. The temperature employed during the reaction is one at which refluxing takes place, such temperature being in part dependent on the nature of the reacting materials themselves, and the conditions such as whether or not superatmospheric pressure is maintained during the course of the reaction. The refluxing may be due to one of the organic reactants or to the solvent and when diethyl ether is employed as the Grignard solvent, the temperature is usually one at which the ether refluxes.

It has also been found that in general the concurrent reaction of the organic halide with silicon tetrachloride or other silicon halide is accelerated by the presence of some solvent in which a Grignard reagent is easily formed such as ethyl ether, butyl ether, ethyl orthosilicate and the like, or of the Grignard reagent itself. Such solvent is called herein "Grignard solvent." Catalysts formerly employed for accelerating Grignard reactions may be present.

Thus the present invention comprises the following: a mixture of the organic halide and silicon halide may be made and added to magnesium metal in the presence of a solvent. A reaction ensues with the direct formation of the desired substituted silicon halide. The degree of substitution of the silicon halide is easily controllable by varying the proportion of either the magnesium metal or the organic halide or both. It is thus possible to produce in good yields for instance, a mono-alkyl silicon tri-halide, a di-alkyl silicon di-halide, a tri-alkyl silicon mono-halide, a tetra alkyl silicon, or related compound. The excellent control of the process of the present invention and the production of substantially pure substituted silicon halides is surprising since on theoretical grounds it would be predictable that mixtures of all possible substituted silicon halides and derivatives would result.

So that as a result of the present processes, the simple substituted silicon halides and related derivatives are produced in a relatively pure form. These halides which may be readily distillable in many cases, may then serve as intermediates in the production of a number of industrially usable products. For instance they may be reacted with alcohols, glycols, amines, acid salts and the like, or they may be hydrolyzed in water and converted into tough plastic materials by the application of heat or catalysts, or other uses will appear as hereinafter set forth.

The following examples illustrate the processes of the present invention and the products obtainable.

In the first example ethyl silicon trichloride is prepared by adding a mixture of ethyl bromide and silicon tetrachloride to magnesium turnings in ether.

*Example 1.*—In a 4-liter, 3-neck, round-bottom flask, equipped with a stirrer and a reflux condenser were placed 24.4 g. (1.0 mole) of magnesium turnings and 1500 ml. of diethyl ether. A dropping funnel was placed in the other opening of the flask and in the funnel was placed a mixture of 114.7 ml. (1.0 mole) of silicon tetrachloride and 76.2 ml. (1.0 mole) of ethyl bromide. The flask was warmed and about 15 ml. of the mixture was run in. After the reaction started the mixture was run in at such a rate that moderate refluxing occurred at an elevated temperature. After all the mixture had been added stirring was continued for one hour with refluxing. The solid was then allowed to settle and the liquid was decanted from it under anhydrous conditions. The solid was transferred to a large volume Soxhlet type extractor and extracted with 500 ml. of ether for about 5 hours. The ether extract was added to the decanted solution and the mixture was distilled through an efficient fractionating column. After several distillations there was obtained 124.4 g. (76%) of ethyl silicon trichloride boiling 98–100° C.

The following example illustrates the preparation of diethyl silicon dichloride by the addition of a mixture of ethyl bromide and silicon tetrachloride to magnesium turnings in ether.

*Example 2.*—In a 3-liter, 3-neck, round-bottomed flask, equipped with a stirrer and a reflux condenser were placed 48.79 g. (2.0 moles) of magnesium turnings and 800 ml. of diethyl ether. A dropping funnel, containing a mixture of 152.0 ml. (2 moles) of ethyl bromide and 114.7 ml. (1.0 mole) of silicon tetrachloride, was placed in third neck of the flask. The contents of the flask was warmed gently and about 10 ml. of the mixture was added from the dropping funnel. After the reaction started the mixture was run in at a rate designed to maintain a moderate reaction at an elevated temperature. After all the mixture had been added stirring was continued, at room temperature, for one hour. The solid was then allowed to settle and the liquid was decanted from it. The solid was extracted four times with 100 ml. portions of ether. The ether extracts were combined with the decanted solution and the whole subjected to fractional distillation. There was obtained 73.0 g. of a product boiling 128–130° C. This weight corresponds to a 46% yield of diethyl silicon dichloride.

In Example 3 triethyl silicon chloride is prepared by adding a mixture of silicon tetrachloride and ethyl bromide to magnesium turnings in ether.

*Example 3.*—In a 5-liter, 3-neck, round-bottom flask, equipped with a reflux condenser and a stirrer, were placed 146.0 g. (6 moles) of magnesium turnings and 1500 ml. of diethyl ether. A mixture of 229.4 ml. (2 moles) of silicon tetrachloride and 457.8 ml. (6 moles) of ethyl bromide was placed in a dropping funnel. About 15 ml. of the mixture was run into the ether and magnesium and the contents of the flask were warmed until the ether refluxed. After the reaction started the mixture was added at such a rate that moderate refluxing was maintained at an elevated temperature. The reaction flask was stirred at room temperature for one hour after the final addition of the mixture. The solid was then allowed to settle and the liquid portion was separated from it by decantation. The salt was then washed repeatedly with 200 ml. portions of ether. Due to the large quantity of solid the extraction was inefficient. The washings were added to the original decanted material and the whole subjected to fractional distillation. Eighty grams of triethyl silicon chloride boiling at 144–150° C. was obtained.

In the next example a mixture of silicon tetrachloride and butyl bromide is added to magnesium turnings in ether.

*Example 4.*—In a 1-liter, 3-neck, round-bottom flask, equipped with a stirrer and a reflux condenser, were placed 300 ml. of diethyl ether and 12.2 g. (0.5 mole) of magnesium turnings. A mixture of 57.4 ml. (0.5 mole) of silicon tetrachloride and 54.0 ml. (0.5 mole) of n-butyl bromide was placed in a dropping funnel attached to the reaction flask. About 10 ml. of the mixture was added to the ether-magnesium and the flask was warmed. After the reaction started the silicon tetrachloride-butyl bromide mixture was added at such a rate that moderate refluxing was maintained at an elevated temperature. After all the mixture had been added stirring was continued, at room temperature, for one hour. The condenser was then set for distillation and an oil bath was placed around the reaction flask. The temperature of the oil was raised gradually, over a period of four hours, to 325° C. The distillate thus obtained was subjected to fractional distillation. A 67% yield of n-butyl silicon trichloride, boiling 147-149° C., was obtained.

In Example 5 tetraethyl silane is prepared by dropping a mixture of ethyl bromide and silicon tetrachloride on magnesium turnings in ether.

*Example 5.*—In a 3-liter, 3-neck, round-bottom flask, equipped for stirring and refluxing, were placed one liter of ether and 48.6 g. (2.0 moles) of magnesium turnings. A dropping funnel, containing 152.0 ml. (2 moles) of ethyl bromide and 57.3 ml. (0.5 mole) of silicon tetrachloride, was placed in the third neck of the flask. The contents of the flask were warmed and about 10 ml. of the mixture was added. After the start of the reaction the mixture was run in to the reaction flask at such a rate as to maintain moderate refluxing of the ether at an elevated temperature. Stirring was continued for one hour after the final addition of the ethyl bromide-silicon tetrachloride mixture. The condenser was then set for distillation and the volatile material was distilled from the salt. The mixture obtained was fractionally distilled and tetraethyl silane, boiling 152-154° C., was collected.

The following example is further illustrative.

*Example 6.*—A 5-liter, 3-neck, round-bottom flask was fitted with an ice jacketed dropping funnel, a mechanical stirrer and a condenser; brine at 0° C. was circulated through the condenser during the course of the reaction. A calcium chloride tube was attached to the end of the condenser.

Two liters of dry ether and 24 g. (1 mole) of magnesium turnings were placed in the flask. The ether used was obtained from the following two sources:

(1) 1200 ml. of dry, unused ether;
(2) 800 ml. of ether distillate obtained from a previous preparation of 1 mole of methyl silicon trichloride. This ether, although boiling within the proper range for pure diethyl ether (35-36° C.) nevertheless contained approximately 25 g. of methyl silicon chloride which could not be separated by the usual distillation methods. The amount of methyl silicon chloride was determined by evaporating, at room temperature, a 200 ml. aliquot which had previously been treated with water, and weighing the clear, glassy solid obtained. Calculations made on the assumption that the glassy solid had the composition $(CH_3SiO)_x$ indicated that the 800 ml. total contained approximately 25 g. of methyl silicon trichloride. For this experiment then the above type of ether-methyl silicon chloride solution will be referred to as "recycled ether."

95 g. (1 mole) of methyl bromide gas was condensed to a liquid and mixed with 170 g. (1 mole) of cold silicon tetrachloride. The mixture was placed in the ice-jacketed dropping funnel. About 10 ml. of the mixture was run into the flask containing the magnesium. The reaction was started by gently warming the contents of the flask for a few minutes. The stirrer was started and the rest of the mixture was added dropwise at such a rate that moderate refluxing was maintained at an elevated temperature during the entire addition. When the mixture had all been added the contents of the flask was stirred for 1 hour at room temperature. Essentially all of the magnesium had disappeared at this point. The mixture was next cooled in an ice bath and the liquid layer was decanted from the salt under anhydrous conditions. The solid was then washed four times with 100 ml. portions of cold ether and the washings were added to the original decanted material.

Distillation of the mixture was made through a 180 cm. column packed with ⅛ inch glass helices. The ether was removed at 35-36° C. A few mls. were collected from 36-60° C. There was obtained 112 g. boiling 60-65° C. This amount represented a yield of 75% of crude product calculated as methyl silicon trichloride. Redistillation of this product gave 97 g. boiling point 63.5-65.6° C. Analysis of this material for chlorine gave the following results:

Calculated for $CH_3SiCl_3$, % Cl=71.2; found, % Cl=69.1.

The value found (69.1%; average of 5 checking determinations) compares favorably with the results obtained by other independent workers for the percentage of chlorine in methyl silicon trichloride. The product obtained, boiling 63.5-65.5° C., represents, therefore, a yield of 65% of nearly pure methyl silicon trichloride.

In the distillation nothing was obtained boiling above 65.5° C. except a small residue (about 12 g.) with a boiling range above 100° C. No evidence was obtained by distillation or analysis of any appreciable quantity of a possible contaminant like dimethyl silicon dichloride. When the ether distillation was hydrolyzed and evaporated there was obtained a residue corresponding to approximately 22 g. of methyl silicon trichloride. This value differed from the value found for the recycled ether by only 3 g. and this recovered ether could then be used to prepare the next batch of methyl silicon trichloride.

Thus it has been found that the use of recycled ether containing a small amount of product enhances the yields and workability of the process of the present invention.

The following additional examples exemplify variations in starting materials, reaction conditions, and other features.

*Example 7.*—A reaction was started by warming a mixture of 6 parts of magnesium turnings, 4 parts of n-butyl bromide and 4 parts of ethyl orthosilicate. After the vigorous reaction subsided somewhat, a mixture of 30.3 parts of n-butyl bromide and 42.5 parts of silicon tetrachloride were added slowly, with stirring, over a period of one-half an hour. The mixture was then heated on a boiling water bath for 3 hours. The solid mass obtained was extracted with 144 parts of ethyl ether and the extract was poured on cracked ice. The ether layer was separated from the water and the ether evaporated. A viscous liquid remained which condensed to a clear, brittle, insoluble, infusible resin when heated at 120° C. for 4 hours.

*Example 8.*—Two parts of ethyl bromide and 6 parts of magnesium turnings were placed in 108 parts of isopropyl ether. After the reaction had started, and was proceeding at a good rate, a mixture of 25.2 parts of ethyl bromide and 42.5 parts of silicon tetrachloride was added slowly, with stirring, over a period of 1 hour. The mixture was then heated on a hot water bath for 1 hour, cooled and poured on ice. The ether layer was washed with water to remove hydrogen chloride. After evaporation of the ether a viscous liquid was obtained. The liquid, when heated at 120° C. for 4 hours, changed to a clear, brittle, insoluble, infusible resin.

*Example 9.*—Two parts of n-amyl bromide and 6 parts of magnesium turnings were placed in 108 parts of ethyl ether. After the reaction had started, and was proceeding at a moderate rate, a mixture of 35.7 parts of n-amyl bromide and 42.5 parts of silicon tetrachloride was added slowly, with stirring over a period of 1 hour. The mixture was then heated on a hot water bath for 1 hour, diluted with 60 parts by volume of hexane solvent, cooled and poured on ice. The ether layer was washed with water to remove hydrogen chloride. After evaporation of the ether, a hexane solution was obtained. The solution, when poured out as a film and heated at 150° C. for 3 hours, changed to a clear, insoluble, infusible resin coating.

Example 10.—Two parts of benzyl chloride and 6 parts of magnesium turnings were placed in 108 parts of ethyl ether. After the reaction had started, by the formation of a small amount of benzyl magnesium chloride, a mixture of 29.6 parts of benzyl chloride and 42.5 parts of silicon tetrachloride was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. This liquid, when heated at 120° C. for 4 hours, changed to a clear, insoluble, infusible resin.

Example 11.—Two parts of allyl bromide and 6 parts of magnesium turnings were placed in 108 parts of ethyl ether. After the reaction had started, and was proceeding at a moderate rate, a mixture of 28.2 parts of allyl bromide and 42.5 parts of silicon tetrachloride was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. This liquid, when heated at 120° C. for 4 hours, changed to a clear, brittle, infusible resin.

Example 12.—Two parts of bromobenzene and 6 parts of magnesium turnings were placed in 108 parts of ethyl ether. After the reaction had started, a mixture of 37.2 parts of bromobenzene and 42.5 parts of silicon tetrachloride was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. This liquid, when heated at 120° C. for 4 hours, changed to a clear, brittle, insoluble, infusible resin.

Example 13.—Two parts of methyl iodide and 6 parts of magnesium turnings were placed in 108 parts of ethyl ether. After the reaction had started, and was proceeding at a moderate rate, a mixture of 51.1 parts of methyl iodide and 42.5 parts of silicon tetrachloride (molar rato of methyl iodide to silicon tetrachloride 1.5 to 1) was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. This liquid, when heated at 120° C. for 2 hours, changed to a clear, infusible resin.

Example 14.—3.6 parts of magnesium metal were placed in a reaction vessel equipped with a stirrer. 54 parts of diethyl ether were added and stirring started. A mixture of 21.3 parts of methyl iodide and 17 parts of silicon tetrachloride was made and added slowly. An exothermic reaction began and continued during the addition of the hydrocarbon iodide and silicon halide. On hydrolysis the reaction product, a 40% yield of viscous, hydroxylated, methyl silicon was obtained. This set to a hard tough resin on application of a slight amount of heat.

Example 15.—2.4 parts of magnesium metal were placed in a reaction vessel. 54 parts of diethyl ether were added and stirring started. A mixture of 15.6 parts of ethyl iodide and 17 parts of silicon tetrachloride was made and added slowly to the magnesium. An exothermic reaction commenced and continued throughout the addition. On hydrolysis of the reaction product, a viscous liquid resulted which polymerized at room temperature overnight to a hard, tough, clear resin.

Thus the process of the present invention consists essentially of a one step reaction without the necessity for the preparation of a Grignard reagent separately so that a simple, economic and easily controllable reaction is produced in which excellent yields of the desired materials are obtained. It has been found that in the one step procedure, a very satisfactory yield of the desired reactant is obtained despite the fact that on theoretical grounds it might be predicted that a difficulty separable mixture of all possible reaction products would result. Thus the results of the present process are all the more surprising since the weight of theoretical knowledge is against the success of such a process.

In the case where a solvent is used in the process of the present invention, and especially an ether solvent such as ethyl ether, the reaction proceeds rapidly. In some cases a violet reaction occurs. It has been found that excellent control may be achieved by the addition of one or both of the reactants to the magnesium metal, slowly. In some cases the reaction does not proceed exothermically but must be carried forward by the application of heat. In these cases, especially where a low boiling volatile halide is employed, it is necessary to carry out the reaction under pressure.

While the examples as given above show the production of organo silicon halides or of silanes containing one type of organic group, it is also possible to prepare mixed halides or mixed silanes, that is, such derivatives in which two or more different kinds of organic substituents are present such as for example, methyl butyl silicon dihalide, ethyl propyl silicon dihalide, diethyl butyl silicon halide, and the like, by the one step process of the present invention. For example, methyl silicon trichloride may be prepared and then instead of separating the material, it is mixed with butyl bromide and the mixture reacted in the presence of magnesium to produce the methyl butyl silicon dichloride. Or such dichloride may be further reacted in a one step method to produce a silicon monochloride containing three organic substituents and the latter may in turn be converted into a silane containing up to four different organic substituents in the molecule.

The substituted silicon halides and tetra substituted silicons prepared according to the above descriptions may be preserved for future use by placing them in solvents or they may be sealed in containers. The halide materials tend to fume in the air and corrode corrodible materials with which they are in contact. With fuming in moist air, hydrogen halides are formed and substituted silicon oxides are precipitated. Thus for storage and shipment it is best to have the containers moisture-proof or of non-corrosive material and sealed from contact with the air. The silicon halide derivatives and tetra substituted silicons of the present invention are soluble in a large variety of solvents such as hexane, benzene, toluene and so forth; ethers such as dimethyl, diethyl, diisopropyl, dibutyl, or mixed ethers, esters such as ethyl, butyl, or amyl acetates and so forth. It is also possible to react the substituted halides of the present invention with alcohols in order to form the alkoxy silicon derivatives or the acyl substituted silicons may be prepared according to the process of our co-pending application.

As the hydrocarbon substituents attached to the silicon in the substituted silicon halides and tetra substituted silicons of the present invention, there may be present alkyl, aryl, olefinyl, alkenyl, alkynyl, arenyl and arynyl, alicyclic, cyclo non-aromatic, aralkyl derivatives as illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl and radicals from such derivatives as phenylacetylene.

The silicon halide is desirably the tetra halide such as silicon tetra chloride, silicon tetra bromide and silicon tetra iodide, but other derivatives can be used such as silicon tetra-fluoride, disilicon hexahalides, trisilicon octahalides and polysilicon polyhalides, silicon oxychlorides, and the like.

The materials made by the process of the present invention may be used for a large number of applications; for instance, as pointed out above, the substituted silicon halides may be reacted with hydroxy compounds or they may be hydrolyzed and used in a solvent, and the like.

The hydrolyzed or partially hydrolyzed or etherified alkoxy or acyl or unchanged materials of the present invention may be used as lacquers or adhesives either alone or in mixture with other completely reacted or potentially reactive compounds. Such compounds may include resins such as rosin, copal, shellac and so forth, as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives, including the esters of acrylic and methacrylic acids and so forth.

The silicon derivatives of the present invention, as illustrated above, may be used as textile finishing compresses to render the textiles hydrophobic. This process may also be applied to ceramics or metals, especially those materials which naturally possess a thin oxide coating. Conversion products of the present invention may also be used on textiles to produce waterproofing, creaseproofing, wrinkleproofing, and the like.

The silicon derivatives of the present invention may be used alone (i. e., tetra substituted silicon) or certain hydrolytic products may be used as lubricating oils, or may be used as additives to hydrocarbon oils such as lubricating oils and also for inclusion with vegetable oils, particularly the drying oils such as linseed oil and China-wood oil and the semi-drying oils such as soya bean oil and so forth, as well as the non-drying oils including castor oil and so forth. Thus certain substituted silicon derivatives made from the intermediates of the present invention may be blended or cooked with the vegetable oils. Certain of the hydrolytic products of the present invention may be used as heat transfer liquids since they possess in general excellent heat stability. In view of their excellent electrical properties, some of the conversion products of the intermediates made according to the process of the present invention may be used either per se or as varnishes and so forth in producing coatings or coated articles for electrical insulation and as a dielectric liquid and so forth. These silicon derivatives may also be used in the production of laminated products for bonding together two or more sheets of the same or different organic or inorganic materials. The silicon derivatives are utilizable as plasticizers as well as binders and their utilization for such purposes may be controlled by the number of alkyl or aryl or similar substitutent introduced into the derivative.

When ethyl ether is employed as the solvent of the present invention, we prefer to carry out the reaction at an elevated temperature or one which allows the ether to reflux at ordinary pressures. This would be approximately 35° C. for ethyl ether. However, if we desire to obtain a higher temperature, the reaction may be carried out under slight pressure and thus the temperature of reaction may be elevated to about 40° or 50° C. When we employ no solvent or high boiling materials such as toluene, butyl ether, etc. the temperature sometimes rises as high as 150° C. or higher. When the lower temperatures, such as 35° C. are used with ethyl ether, it has been found desirable to maintain a rapid to moderate reflux in order to carry out the one-step reaction of the present invention so as to obtain the best possible yields. However, we have found that if we allow the temperature to drop substantially, poor yields result. Thus the condition set that a temperature of about 30°–35° C. would be about the lowest permissible. As regards the upper limit of temperature, this would be rather flexible and temperatures up to 200° C. would be permissible.

Having thus set forth our invention, we claim:

1. The method of preparing an organo silicon derivative which comprises adding a mixture of a halohydrocarbon and a silicon halide to a mixture of magnesium and a Grignard solvent at a temperature at which refluxing takes place to produce a reaction product containing an organo silicon halide in substantial amount, the organo group being the hydrocarbon group present in the halo-hydrocarbon.

2. The method of preparing an organo silicon derivative which comprises adding a mixture of an alkyl halide and silicon halide to a mixture of magnesium and a Grignard solvent at a temperature at which refluxing takes place to produce a reaction product containing an alkyl silicon halide in substantial amount, the alkyl group being that of the alkyl halide.

3. The method of preparing an organo silicon derivative which comprises adding a mixture of an aryl halide and silicon halide to a mixture of magnesium and a Grignard solvent at a temperature at which refluxing takes place to produce a reaction product containing an aryl silicon halide in substantial amount, the aryl group being that of the aryl halide.

4. The method of preparing an organo silicon derivative which comprises adding a mixture of a halohydrocarbon and a silicon halide to a mixture of magnesium and a Grignard solvent of an alkyl ether having not more than four carbon atoms at a temperature at which refluxing of the ether takes place to produce a reaction product containing an organo silicon halide in substantial amount, the organo group being the hydrocarbon group present in the halo-hydrocarbon.

5. The method of preparing an organo silicon derivative which comprises adding a mixture of an alkyl halide and a silicon halide to a mixture of magnesium and a Grignard solvent of an alkyl ether having not more than four carbon atoms at a temperature at which refluxing of the ether takes place to produce a reaction product containing an alkyl silicon halide in substantial amount, the alkyl group being that of the alkyl halide.

6. The method of preparing an organo silicon derivative which comprises adding a mixture of an aryl halide and a silicon halide to a mixture of magnesium and a Grignard solvent of an alkyl ether having not more than four carbon atoms at a temperature at which refluxing of the ether takes place to produce a reaction product containing an aryl silicon halide in substantial amount, the aryl group being that of the aryl halide.

7. The method of preparing an organo silicon halide having a single substituent organic group which comprises adding a mixture of a halo-hydrocarbon and silicon halide to a mixture of magnesium and a Grignard solvent at a temperature at which refluxing takes place, the mole ratios of the reactants being 1:1:1 to produce a reaction product containing an organo silicon halide in substantial amount, the organo group being the hydrocarbon group present in the halo-hydrocarbon.

8. The method of preparing an organo silicon halide having two substituent organic groups which comprises adding a mixture of a halo-hydrocarbon and a silicon halide to a mixture of magnesium and a Grignard solvent at a temperature at which refluxing takes place, the mole ratios of the halo-hydrocarbon to silicon halide to magnesium being 2:1:2 to produce a reaction product containing an organo silicon halide in substantial amount containing two substituent organo groups, the organo groups being the hydrocarbon group present in the halo-hydrocarbon.

9. The method of preparing an organo silicon halide having three substituent organic groups which comprises adding a mixture of a halo-hydrocarbon and a silicon halide to a mixture of magnesium and a Grignard solvent at a temperature at which refluxing takes place, the mole ratios of halo-hydrocarbon to silicon halide to magnesium being 3:1:3 to produce a reaction product containing an organo silicon halide in substantial amount containing three substituent organo groups, the organo groups being the hydrocarbon group present in the halo-hydrocarbon.

10. The method of preparing an organo silicon halide having two substituent organic groups which comprises adding a mixture of a halo-hydrocarbon and a silicon halide to a mixture of magnesium and a Grignard solvent at a temperature at which refluxing takes place, the mole ratios of the reactants being 1:1:1, to form a silicon halide having one substituent hydrocarbon group, and adding a mixture of said halide and an added halo-hydrocarbon to a mixture of magnesium and a Grignard solvent at a temperature at which refluxing takes place in which the mole ratios of the reactants is 1:1:1 to produce a reaction product containing an organo silicon halide in substantial amount containing two substituent organo groups, one of which is derived from the second halo-hydrocarbon.

11. A process as set forth in claim 10, in which the halo-hydrocarbon used in the second step is different from that used in the first step.

12. The method of preparing an organo silicon halide having three substituent organic groups which comprises adding a mixture of a halo-hydrocarbon and a silicon halide to a mixture of magnesium and a Grignard solvent at a temperature at which refluxing takes place, the mole ratios of the reactants being 1:1:1, to form a silicon halide having one substituent hydrocarbon group, adding a mixture of the last stated silicon halide and an added halo-hydrocarbon to a mixture of magnesium and a Grignard solvent at a temperature at which refluxing takes place, the mole ratios of the reactants being 1:1:1 to form a silicon halide having two substituent hydrocarbon groups, and adding a mixture of the last stated silicon halide and an added halo-hydrocarbon to a mixture of magnesium and a Grignard solvent at a temperature at which refluxing takes place, the mole ratios of the reactants being 1:1:1 to produce an organo silicon halide in substantial amount containing three substituent organo groups derived from the halo-hydrocarbons.

13. The method of preparing an organo silicon derivative which comprises adding a mixture of a low boiling halo-hydrocarbon and a silicon halide to a mixture of magnesium and a Grignard solvent under superatmospheric pressure at a temperature at which refluxing takes place to produce a reaction product containing an organo silicon halide in substantial amount, the organo group being the hydrocarbon group present in the halo-hydrocarbon.

14. The method as set forth in claim 8 for preparing diethyl silicon dichloride in which the halo-hydrocarbon is ethyl bromide and the silicon halide is silicon tetrachloride.

JOHN B. RUST.
CHARLES A. MacKENZIE.

REFERENCES CITED

The following references are of record in the file of this patent:

Martin and Kipping, Jour. Chem. Soc. (London), vol. 95, pp. 302–314 (1909).

Luff and Kipping, Jour. Chem. Soc. (London), vol. 93, pp. 2004–2016 (1908).

Challenger & Kipping, Jour. Chem. Soc., (London), vol. 97, pp. 142–147 (1910).

Andrianov, Chemical Abstracts, vol. 32, pp. 7892–7893 (1938).

Post, Jour. Org. Chem., vol. 5, pp. 575–576 (1940).